INVENTOR.
Walter Sommer 3,212,168
TOP ROLLER ARRANGEMENT FOR DRAWING MECHANISM
Walter Sommer, Leonberg, Wurttemberg, Germany, assignor to SKF Kugellagerfabriken Gesellschaft mit beschrankter Haftung, Stuttgart-Bad Cannstatt, Germany, a company of Germany
Filed Jan. 30, 1964, Ser. No. 341,454
Claims priority, application Germany, Feb. 2, 1963, S 83,573, S 83,572
16 Claims. (Cl. 29—116)

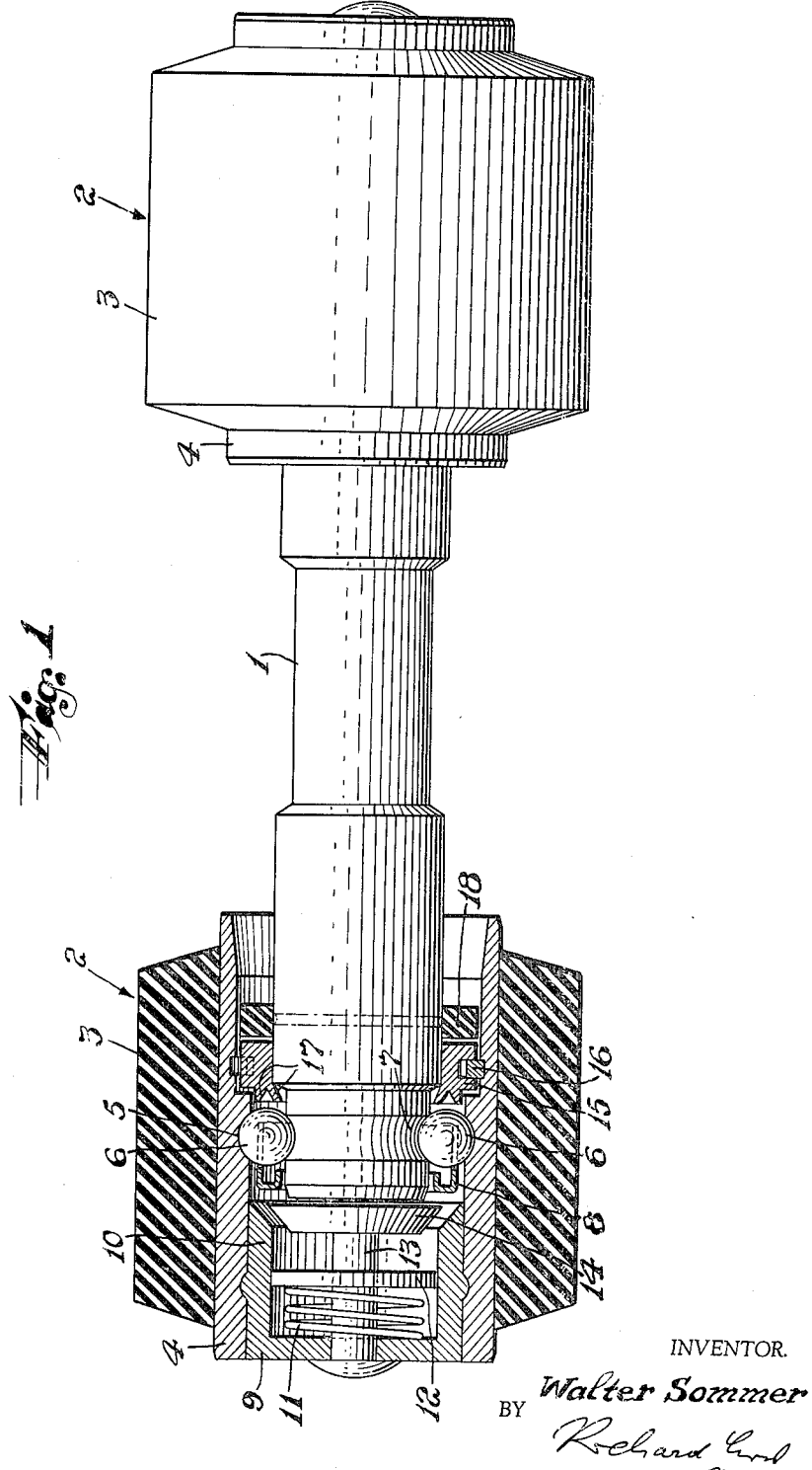

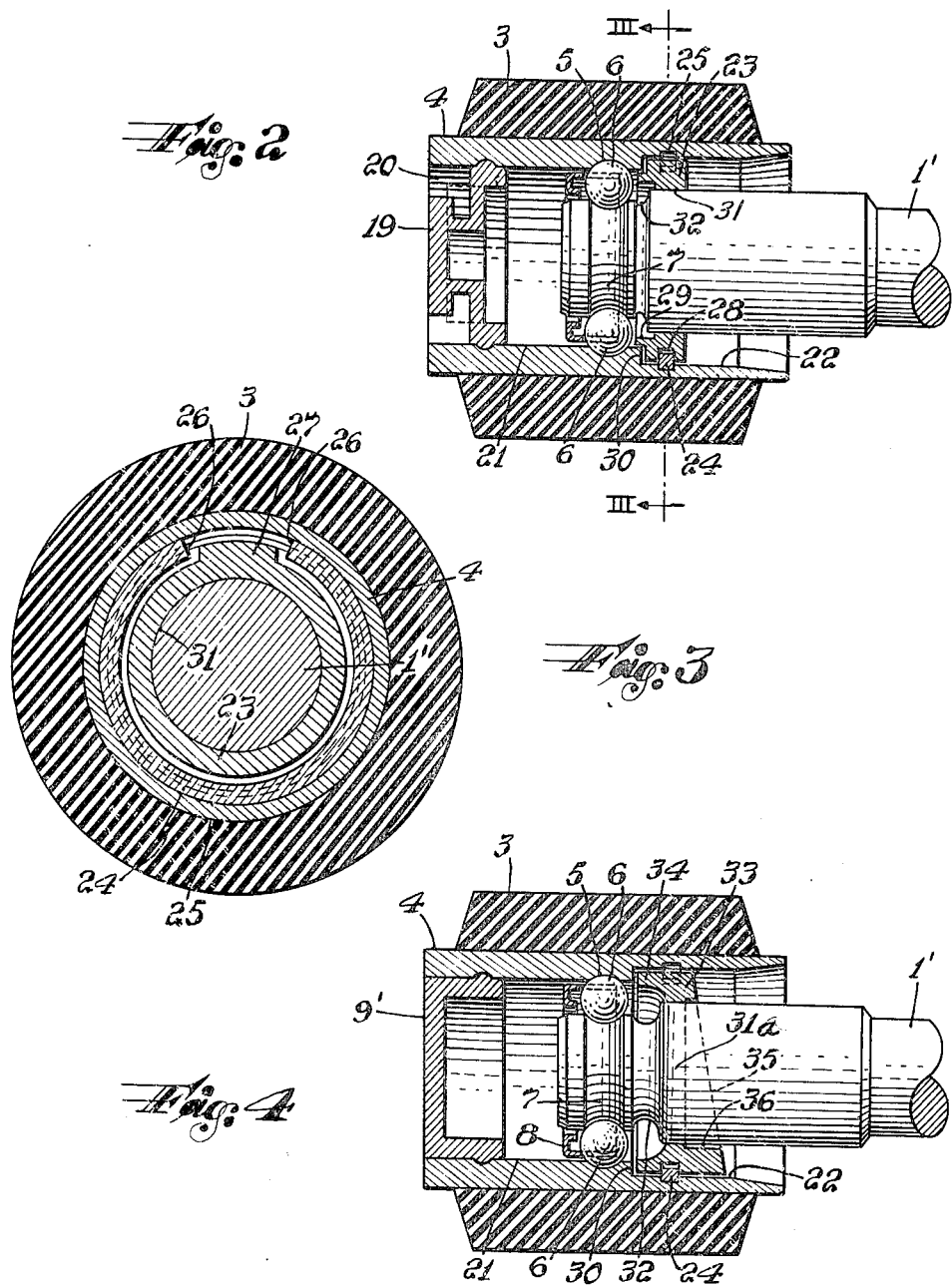

This invention relates to textile spinning machines, and more particularly to a top roller arrangement for drawing mechanisms on such machines.

The specific type of drawing mechanism with the improvement of which this invention is concerned has a centrally supported shaft secured against rotation whose two free ends carry respective top rollers. Each top roller consists of a rigid tubular sleeve and of a resilient outer facing on the sleeve. An antifriction bearing is interposed between the shaft and the sleeve to permit free rotation of the top roller at high speed.

Lack of friction in the bearing is of primary importance. Drawing mechanisms operate in an atmosphere heavily contaminated with lint and other small solid particles. Entry of such contaminants into the bearing must be prevented. An important object of this invention is the provision of a top roller arrangement in which the bearing is safely protected from contamination by foreign matter.

The overall diameter of the top roller is limited not only by considerations of machine design, but also by such practically invariable factors as the length of the fibers to be processed. It is generally desirable to use small top rollers. The thickness of the resilient outer face layer cannot be reduced beyond rather rigid limits without unduly reducing its resiliency, and thereby impairing its performance. The diameter of the inner sleeve thus cannot exceed a certain maximum. The cross section of the sleeve determines the dimensions of the bearing and of the shaft portion enclosed therein. An object of the invention is the provision of a bearing and of a shaft configuration within the top roller which provide ruggedness and long useful service to the top roller while conforming to the limited space available.

A more specific object is the provision of automatic lubrication devices within the narrow confines of the top roller, and a concomitant space saving configuration of the other elements contained within the axial top roller cavity. The use of needle bearings or ball bearings is specifically contemplated, and the invention aims at providing sufficient space within a top roller to permit the use of a cage together with a ball bearing without unduly enlarging the diameter of the roller, and without sacrificing mechanical strength.

Generally, the invention aims at a top roller arrangement capable of long service with a minimum of maintenance.

With these and other objects in view, as will hereinafter appear, the invention in one of its aspects provides a tubular sleeve member coaxially mounted on each of the two end portions of a stationary shaft, the arrangement being such that the radial end faces of the shaft are received within the axial cavities of the rollers, and the shaft projects from one axial end of each roller cavity. Bearing members of circular cross section are radially interposed in the cavity between the shaft and the tubular member for rolling engagement with the same during rotation of the sleeve member about its axis. The bearing members, such as balls or needles, are angularly spaced about this axis.

A cover member engages the tubular sleeve and axially closes the cavity end which is free of the shaft. An annular gasket member is interposed between the shaft and the sleeve member. It is arranged axially intermediate the bearing members and the cavity end from which the shaft projects.

The exact nature of this invention as well as other objects and advantages thereof will be readily apparent from consideration of the following specification relating to the annexed drawing in which:

FIG. 1 shows a stationary shaft and two top rollers of the invention in front elevation, one of the rollers being axially sectioned to reveal inner structural elements;

FIG. 2 shows one of the top rollers and a portion of a shaft of a modified embodiment of the invention in axial section;

FIG. 3 shows a portion of the apparatus of FIG. 2 in radial section on the line III—III; and FIGS. 4 to 6 illustrate additional embodiments of the invention in respective views corresponding to that of FIG. 2.

Figure 5:
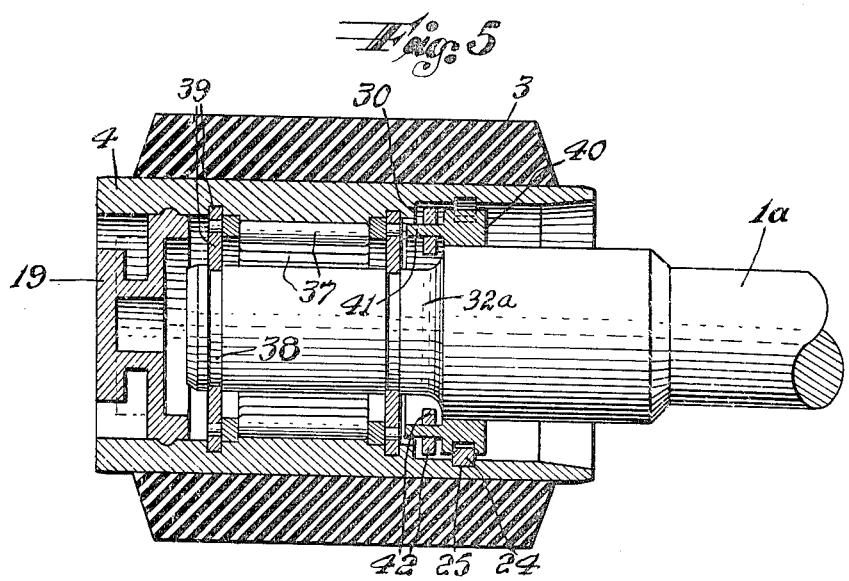

Referring now to the drawing in detail, and initially to FIG. 1, there is seen a shaft 1 the axially central portion of which is of reduced diameter and is normally fixedly engaged by a supporting element on the spinning machine. Each free axial end of the shaft 1 carries a top roller 2. The shaft portion between the top roller 2 carrying end portions is referred to as intermediate portion. The outer cylindrical surface of the roller is constituted by a facing 3 of yieldably resilient material which is fastened on a tubular metal sleeve 4. An annular groove 5 in the sleeve 4 provides an outer track for the balls 6 of a ball bearing. The inner track is provided by a similar groove 7 in the end portion of the shaft 1 whose diameter is reduced in a manner similar to the central shaft portion. The balls are held in circumferentially spaced positions by a cage 8.

The outer end of the cavity in the sleeve 4 is closed by a cup shaped cover 9 which is secured in the sleeve by a bayonet type connection only partly visible in the drawing. A cylindrical wall 10 of the cover 9 extends almost to the radial end face of the shaft 1. A piston plate 12 in the interior space of the cover 9 is urged by a helical compression spring 11 to move toward the shaft 1. The piston plate 12 is guided on a fixed axial pin 13 centrally mounted in the cover 9.

The free end of the pin 13 carries a circular distributor plate 14. The beveled edges of the plate 14 and of the wall 10 define a narrow annular passage which connects a storage space between the piston plate 12 and the distributor plate 14 with a portion of the top roller cavity closely adjacent the bearing balls 6. The referred to storage space is normally filled with grease or a similar highly viscous lubricant under the pressure of the spring 11. The automatic lubricating device thus installed inwardly of the cover 9 may provide fresh bearing lubricant at the rate at which it is lost outward along the shaft 1 through the other end of the top roller.

Escape of lubricant at this other end is limited by a seal which includes an annular gasket 15 secured on the sleeve 4 against rotation, and locked in its axial position closely adjacent the balls 6 by a spring clip 16. Two narrow lips 17 of the gasket 15, spacedly and axially projecting toward the balls 6 retain the lubricant within the bearing and impede entry of external contaminants. The action of the gasket 15 is supplemented by that of a gasket ring 18 of grease resistant elastomeric material which is secured on the shaft 1 against rotation at a small distance from the gasket 15 in a direction outward of the roller cavity.

The spacing between the bearing balls 6 and the gasket 15 is only a small fraction of the ball diameter. The shaft 1 need therefore, not extend far into the cavity of the top roller, and the space available within the roller between the bearing and the cover 9 is adequate to enclose an automatic lubricating device whose charge need only be replenished at infrequent intervals. The continuous feeding of lubricant to the bearing increases the useful life of the top roller in an obvious manner.

In the modified embodiment of the invention illustrated in FIGS. 2 and 3, the free end portion of a shaft 1' carries a top roller mainly consisting of a sleeve 4 and a resilient facing 3 supported on bearing balls 6 in a manner closely similar to the showing of FIG. 1, and not requiring further description. The cover 19 which axially closes one end of the roller cavity has recesses 20 which permit the cover to be grasped with an operator's fingers or with a suitable tool when access to the interior space of the cover or of the sleeve is desired without complete disassembly. An automatic lubricating device has been omitted from FIG. 2, but may be provided by interchanging the cover 19 with the cover 9 shown in FIG. 1.

The cylindrical bore portion 21 of the sleeve 4 which is farthest removed from the middle portion of the shaft 1', partly visible in FIG. 2, will be referred to hereinafter as the outer bore portion. The shaft 1' projects from the roller cavity through the inner bore portion 22 which defines together with the outer bore portion 21 a step or shoulder 30. The inner bore portion 22, which has a larger diameter than the portion 21, flares slightly toward its orifice.

The bearing balls 6 run in tracks 5, 7 in the outer bore portion 21 adjacent the shoulder 30, and an annular gasket 23 is arranged mainly in the inner bore portion 22 adjacent that shoulder. The gasket 23 is held in its axial position by a spring clip 24 which is partly received in an annular groove 25 in the sleeve 4, as best seen in FIG. 3. The clip 24 extends about the axis of the shaft 1' in an open circular arc. Its two radial end faces 26 are circumferentially spaced apart so as to receive loosely therebetween a radial lug 27 of the gasket 23. The clip 24 is fixed in the groove 25 by its own resilient tension, and rotates with the sleeve 4. It entrains the gasket 23 during rotation of the sleeve 4 while not interfering with limited radial displacement, within a clip-receiving groove 28, of the gasket whose outer diameter is somewhat smaller than the internal diameter of the clip 24, as is evident from FIG. 3.

Reverting to FIG. 2, there is seen an integral annular lip 29 which axially projects from the gasket 23 toward the shoulder 30. Sealing engagement between the gasket 23 and the shaft 1' is ensured by cooperation of the shaft and gasket at a cylindrical interface 31 which extends over a major portion of the axial length of the gasket. Because of the radial mobility of the gasket 23 on the sleeve 4, the opposite sealing faces of the gasket 23 and of the shaft 1' at the interface 31 are coaxial at all times even in the event of a slight eccentricity of the sleeve.

The reduced terminal portion of the shaft 1' is formed with an annular groove 32 between the bearing balls 6 and the gasket 23. The groove 32 serves as a trap for excess lubricant, and also for any lint which may find its way past the interface 31 of the gasket 23 and the shaft 1'. Axial movement of lint into the bearing of the top roller is virtually impossible from the roller end closed by the cover 19. Entry of lint into the bearing from the top roller end from which the shaft 1' projects is greatly impeded by the arrangement of the roller elements according to this invention.

Because of the location of the gasket 23 at the end of the inner bore portion 22 adjacent the shoulder 30, a major part of the bore portion 22 is freely accessible from the outside and unencumbered. Lint and other foreign particles entering the bore portion 22 are accelerated in a radial and circumferential direction by contact with the sleeve 4 and lose all or most of their initial axial velocity. The open part of the bore portion 22 in effect constitutes a settling area in which foreign matter tends to be immobilized.

The gasket 23, the clip 24, and the sleeve 4 rotate in unison. The probability of foreign matter making its way axially into the bearing between these elements which do not move relative to each other is remote, and the small space between the lip 29 and the shoulder 30 is sufficient to arrest any particles which should reach the area near the lip. The thin tubular lip 29 is so flexible as to absorb the small radial movements of the gasket 23 relative to the sleeve 4. There is no significant relative movement between the lip 29 and of the shoulder 30.

The opposite sealing faces of the shaft 1' and of the gasket 23 at the interface 31 are cylindrical and parallel throughout the useful life of the roller. Lint and other particles which may reach the end of the interface 31 in the bore 22 are not likely to be drawn inward of the roller cavity by the relative movement of the gasket 23 and of the shaft 1'. The groove or trap 32 provides additional safety against foreign matter reaching the bearing elements 6.

The open part of the bore portion 22 may be cleaned of accumulated foreign matter by a blast of compressed air from time to time, and it is known to equip spinning machines with permanently installed suitable air nozzles for removing particles of foreign matter from sensitive areas. Additional safety against penetration of accumulated particles through the seals of the top roller bearing is provided by the arrangement illustrated in FIG. 4.

The construction of the shaft 1' and of the top roller supported thereon is generally similar to that seen in FIG. 2, and the following description will be limited to the distinguishing features of FIG. 4. The annular gasket 33 has an axially projecting lip 34 which extends near to the radial face of the step or shoulder 30 between the bore portions 21, 22 to provide a seal between the gasket and the sleeve 4 during their joint rotation about the shaft 1' and during their slight relative radial movement due to eccentricity of the gasket or sleeve, or due to minor deviations of the various cylindrical surfaces from a truly circular cross section.

The annular end face 35 of the gasket 33 about the shaft 1' in the accessible part of the bore portion 22 is obliquely inclined relative to a radial plane transverse of the shaft axis. The gasket, during its rotation about the shaft 1', thereby tends to sweep foreign matter accumulated on the shaft surface in a direction axially away from the bearing members 6.

Entry of foreign matter into the bearing between the gasket 33 and the shaft 1' is further hindered by an annular gap 36 between the shaft and the gasket, which extends inwardly from an orifice at the end face 35. The forces imparted to a foreign particle trapped in this gap have a resultant whose axial component is in a direction away from the bearing balls 6 because of the oblique configuration of the end face 35.

Figure 6:
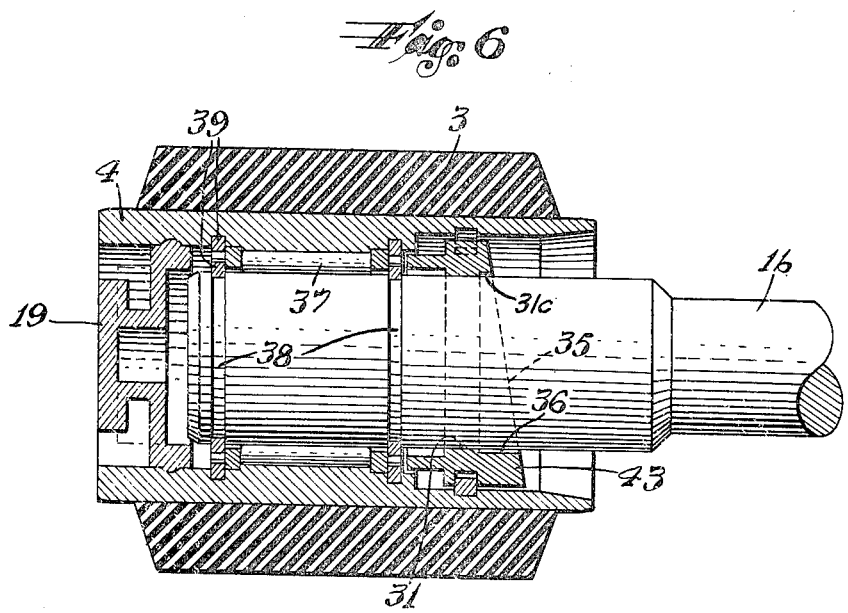

The embodiments of the invention shown in FIGS. 5 and 6 employ needle bearings instead of the ball bearings illustrated in FIGS. 1 to 4, and it will be evident that many of the advantages of this invention may be achieved regardless of other geometrical features of the rolling bearing members of circular cross section necessary for low friction.

The shaft 1a illustrated in FIG. 5 has an axial end portion of reduced cross section within the cavity of the top roller. This end portion is of sufficient length to serve as an inner bearing race for bearing needles 37 axially secured between retaining rings 39. These rings engage corresponding annular grooves 38 in the shaft 1a and in the sleeve 4 in a manner conventional in itself.

The general configuration of the annular gasket 40 interposed between the shaft 1a and the sleeve 4 is similar to that of the gasket 15 shown in FIG. 1. A tubular integral lip 41 projects from the gasket proper toward the bearing needles 37 and extends along the sleeve 4 toward a step or shoulder between two portions of the sleeve bore which differ in cross sectional area. The sealing effect of the lip 41 is enhanced by two radial flanges 42 which respectively extend from a central portion of the lip radially inward toward a trapping groove 32a in the shaft 1a, and radially outward toward the sleeve 4.

The arrangement illustrated in FIG. 6 differs from FIG. 5 by the following features:

Radial flanges are absent on an annular gasket 43 which is interposed between the sleeve 4 and the shaft 1b on which the illustrated top roller is rotatably mounted. The diameter of the shaft 1b is uniform from the interface 31c to the radial end face of the shaft in the roller cavity except for the grooves 38 which partly receive the retaining rings for the bearing needles 37. The end face 35 of the gasket 43 in the accessible or open portion of the roller bore is obliquely inclined relative to the axis of the shaft 1b, and an annular gap 36 is left between the gasket and the sleeve 4 in the manner discussed hereinabove with reference to FIG. 4.

It will be appreciated that many specific features shown in the several figures of the drawing may be combined interchangeably in the manner evident from comparison of FIGS. 5 and 6.

Obviously many other modifications and variations are possible in the light of the above teachings. It is therefore to be understood that, within the scope of the appended claims, the invention may be practiced otherwise than as specifically described.

What is claimed is:

1. A top roller arrangement for a drafting mechanism of a spinning machine, comprising
   (a) a normally stationary shaft having an axis, two end portions, and an intermediate portion, each of said end portions having a radial end face,
   (b) a tubular member coaxially mounted on each of said end portions for rotation about said axis and defining an axial cavity therein, one of the end faces being received in said cavity, said intermediate portion projecting from one end of said cavity, said cavity having two axial portions, one of said cavity portions extending in a direction inward from said one cavity end, the other cavity portion extending in a direction inward from the other cavity end, and being of smaller cross section than said one cavity portion,
   (c) a plurality of bearing members of circular cross section radially interposed in said other cavity portion between the shaft end portion within said cavity and said tubular member, said bearing members being spacedly arranged about said axis for simultaneous rolling engagement with said shaft end portion and said tubular member during rotation of the latter,
   (d) a cover member engaging said tubular member and axially closing said other cavity portion, and
   (e) an annular gasket member interposed between said shaft end portion and said tubular member within said one cavity portion.

2. An arrangement as set forth in claim 1, wherein said gasket member has an end face facing away from said bearing members and obliquely inclined relative to said axis.

3. An arrangement as set forth in claim 2, wherein said shaft and said gasket member define therebetween a narrow annular gap having an orifice in said obliquely inclined end face.

4. An arrangement as set forth in claim 3, wherein said shaft end portion and said gasket member jointly define a cylindrical interface extending axially away from said obliquely inclined end face, the radial spacing of said shaft end portion and said gasket member along said interface being substantially smaller than the spacing thereof in said gap.

5. An arrangement as set forth in claim 1, wherein the axial spacing of said gasket member from said bearing members is substantially smaller than the spacing of said gasket member from said one axial end of said cavity.

6. An arrangement as set forth in claim 5, wherein the spacing of said gasket member from said bearing members is not substantially greater than the diameter of bearing members.

7. The arrangement as set forth in claim 1, said shaft end portion being integrally formed of a first section on the side of said one cavity end and a second section on the side of said other cavity end, said first section having a larger cross-sectional area than said second section.

8. In the arrangement as set forth in claim 7, said tubular member being constituted by two integrally formed parts having substantially the same outer diameter and different inner diameters, the tubular member part having a larger inner diameter opposing said first section, the part having a smaller inner diameter opposing said second section.

9. An arrangement as set forth in claim 1, wherein said one end face and said cover member are axially spaced from each other so as to provide therebetween a storage space adapted to receive a viscous lubricant, said arrangement further comprising feeding means for gradually feeding said lubricant from said storage space in a direction toward said bearing members.

10. An arrangement as set forth in claim 1, further comprising fastening means securing said gasket member against rotation relative to said tubular member while permitting relative radial displacement of said gasket member and of said tubular member.

11. An arrangement as set forth in claim 10, wherein said gasket member has two opposite faces, and said fastening means include abutment means secured on said tubular member against rotation and engageable with one of said opposite faces when said gasket member rotates relative to said tubular member.

12. In the arrangement as set forth in claim 1, a gasket ring axially spaced from said gasket member, said shaft end portion and said tubular member constituting race members of an anti-friction bearing also including said bearing members, said gasket member being secured against rotation relative to one, and said gasket ring being secured against rotation relative to the other, of said race members.

13. An arrangement as set forth in claim 1, further comprising an annular sealing lip integral with said gasket member and axially projecting therefrom toward said bearing members.

14. An arrangement as set forth in claim 1, further comprising an annular sealing lip integral with said gasket member and axially projecting therefrom toward said bearing members, said tubular member being formed with an internal step having a radial face, said lip being adjacent to said radial face.

15. An arrangement as set forth in claim 1, further comprising an annular sealing lip integral with said gasket member and axially projecting therefrom toward said bearing members, said lip including a flange portion extending in a radial plane between said tubular member and said shaft.

16. An arrangement as set forth in claim 1, wherein said shaft end portion is formed with an annular groove in said other axial cavity portion intermediate said bearing members and said gasket member.

References Cited by the Examiner

UNITED STATES PATENTS

| | | | |
|---|---|---|---|
| 2,771,640 | 11/56 | Cotchett | 29—116 |
| 2,861,829 | 11/58 | Johanson et al. | |
| 2,885,247 | 5/59 | Schlums | 29—116 X |
| 2,962,770 | 12/60 | Ingraham | 29—116 |

WALTER A. SCHEEL, *Primary Examiner.*